US012572273B2

(12) United States Patent
Jarvis et al.

(10) Patent No.: US 12,572,273 B2
(45) Date of Patent: Mar. 10, 2026

(54) SYSTEM AND METHOD FOR KEY-VALUE SHARD CREATION AND MANAGEMENT IN A KEY-VALUE STORE

(71) Applicant: Quantum Corporation, San Jose, CA (US)

(72) Inventors: Ben Jarvis, Stillwater, MN (US); Stephen P. Lord, Lakeville, MN (US)

(73) Assignee: Quantum Corporation, Centennial, CO (US)

( * ) Notice: Subject to any disclaimer, the term of this patent is extended or adjusted under 35 U.S.C. 154(b) by 0 days.

(21) Appl. No.: 18/624,367

(22) Filed: Apr. 2, 2024

(65) Prior Publication Data
US 2024/0330263 A1 Oct. 3, 2024

Related U.S. Application Data

(60) Provisional application No. 63/592,863, filed on Oct. 24, 2023, provisional application No. 63/456,762, filed on Apr. 3, 2023, provisional application No. 63/456,524, filed on Apr. 2, 2023.

(51) Int. Cl.
| | |
|---|---|
| *G06F 3/06* | (2006.01) |
| *G06F 16/16* | (2019.01) |
| *G06F 16/182* | (2019.01) |
| *G06F 16/22* | (2019.01) |

(52) U.S. Cl.
CPC .......... *G06F 3/0604* (2013.01); *G06F 3/0631* (2013.01); *G06F 3/0689* (2013.01); *G06F 16/164* (2019.01); *G06F 16/1827* (2019.01); *G06F 16/2246* (2019.01); *G06F 16/2272* (2019.01)

(58) Field of Classification Search
CPC .... G06F 3/0604; G06F 3/0631; G06F 3/0644; G06F 3/067; G06F 3/0689; G06F 16/164; G06F 16/1827; G06F 16/182; G06F 16/2246; G06F 16/2272; G06F 16/278
See application file for complete search history.

(56) References Cited

U.S. PATENT DOCUMENTS

| | | | |
|---|---|---|---|
| 9,361,187 B2 | 6/2016 | Jarvis | |
| 10,133,761 B2 | 11/2018 | Jarvis | |
| 10,852,978 B2 * | 12/2020 | Kurichiyath | .......... G06F 3/0656 |
| 10,896,156 B2 | 1/2021 | Jarvis et al. | |
| 11,086,524 B1 * | 8/2021 | Sun | ........................ G06F 3/0604 |
| 11,210,006 B2 | 12/2021 | Hallak et al. | |

(Continued)

*Primary Examiner* — James E Richardson
(74) *Attorney, Agent, or Firm* — Haris Z. Bajwa

(57) ABSTRACT

Methods and systems for key-value shard creation and management in a key-value store (319). A method includes the steps of partitioning the key-value store (319) including a plurality of keyspaces (364A, 364B) into a plurality of shards including a coordinator shard (362), receiving a first shard assignment value for a first key-value pair from a key-value store client, the key-value store client having access to the key-value store, creating a first shard (321A) using the first shard assignment value, the first shard including a data structure, assigning the first key-value pair to the first shard (321a) based on the first shard assignment value, updating the coordinator shard (362) to reference to the first shard (321A), writing the first shard (321A) to a storage device, and storing modifications to the first shard (321A) in a modified version of the first shard (321A) while the first shard (321A) remains unmodified.

19 Claims, 6 Drawing Sheets

(56)                    References Cited

U.S. PATENT DOCUMENTS

| | | | | |
|---|---|---|---|---|
| 11,604,697 | B2 | 3/2023 | Jarvis | |
| 2010/0146003 | A1* | 6/2010 | Bruso | G06F 16/2246 |
| | | | | 707/E17.044 |
| 2010/0281013 | A1* | 11/2010 | Graefe | G06F 16/2246 |
| | | | | 707/715 |
| 2012/0303577 | A1* | 11/2012 | Calder | G06F 11/2074 |
| | | | | 707/613 |
| 2018/0121503 | A1 | 5/2018 | Bakke et al. | |
| 2021/0243221 | A1* | 8/2021 | Geil | G06F 16/2246 |
| 2021/0263913 | A1* | 8/2021 | Boodman | G06F 16/235 |
| 2021/0303399 | A1 | 9/2021 | Jarvis | |
| 2022/0035532 | A1 | 2/2022 | Vaknin | |
| 2022/0179836 | A1 | 6/2022 | Bakke et al. | |
| 2022/0197546 | A1 | 6/2022 | Bakke et al. | |
| 2023/0133562 | A1 | 5/2023 | Elharrar et al. | |
| 2023/0273732 | A1 | 8/2023 | Vohra et al. | |
| 2023/0409545 | A1* | 12/2023 | Gupta | G06F 16/211 |
| 2024/0028466 | A1* | 1/2024 | Duggal | G06F 16/2246 |
| 2024/0329834 | A1 | 10/2024 | Jarvis et al. | |
| 2024/0330245 | A1 | 10/2024 | Jarvis et al. | |
| 2025/0068605 | A1* | 2/2025 | Diaconu | G06F 16/24573 |

* cited by examiner

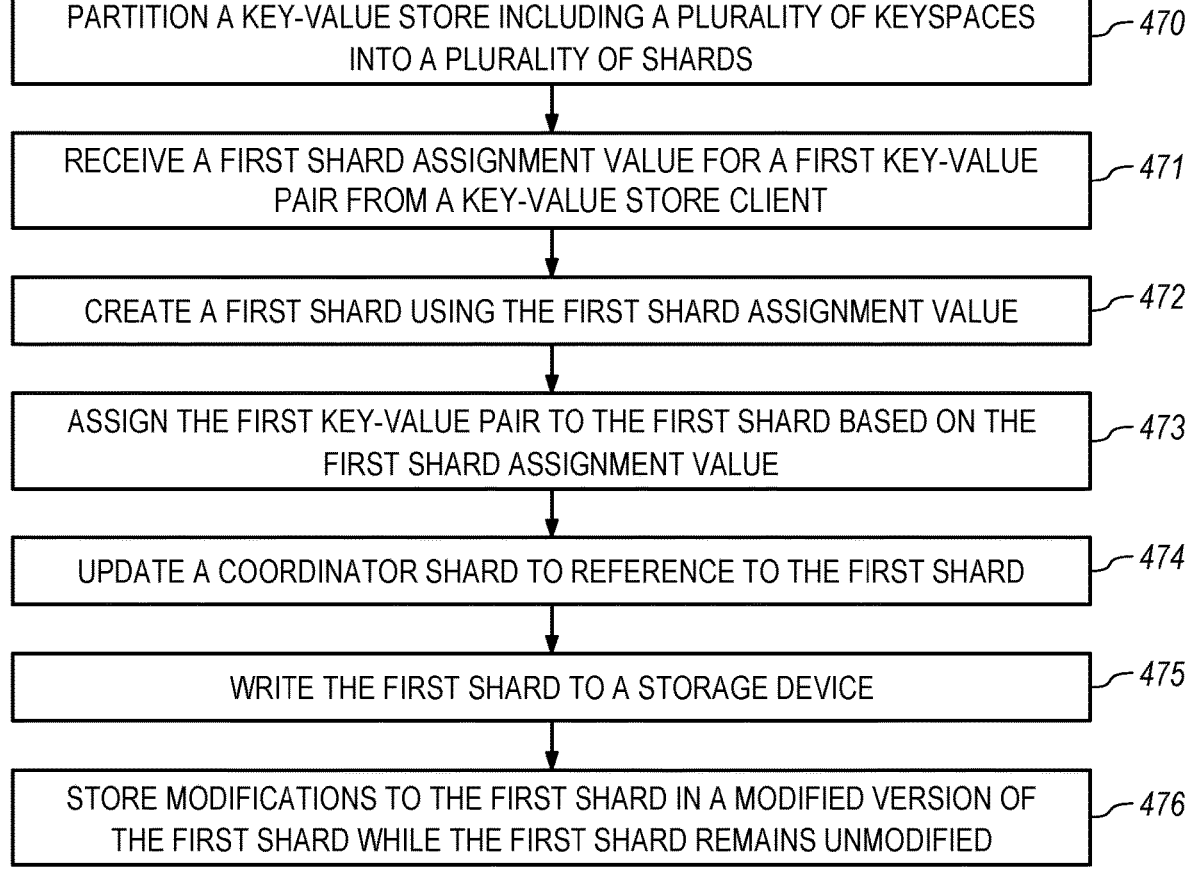

PARTITION A KEY-VALUE STORE INCLUDING A PLURALITY OF KEYSPACES INTO A PLURALITY OF SHARDS ⎯ 470

RECEIVE A FIRST SHARD ASSIGNMENT VALUE FOR A FIRST KEY-VALUE PAIR FROM A KEY-VALUE STORE CLIENT ⎯ 471

CREATE A FIRST SHARD USING THE FIRST SHARD ASSIGNMENT VALUE ⎯ 472

ASSIGN THE FIRST KEY-VALUE PAIR TO THE FIRST SHARD BASED ON THE FIRST SHARD ASSIGNMENT VALUE ⎯ 473

UPDATE A COORDINATOR SHARD TO REFERENCE TO THE FIRST SHARD ⎯ 474

WRITE THE FIRST SHARD TO A STORAGE DEVICE ⎯ 475

STORE MODIFICATIONS TO THE FIRST SHARD IN A MODIFIED VERSION OF THE FIRST SHARD WHILE THE FIRST SHARD REMAINS UNMODIFIED ⎯ 476

*FIG. 4*

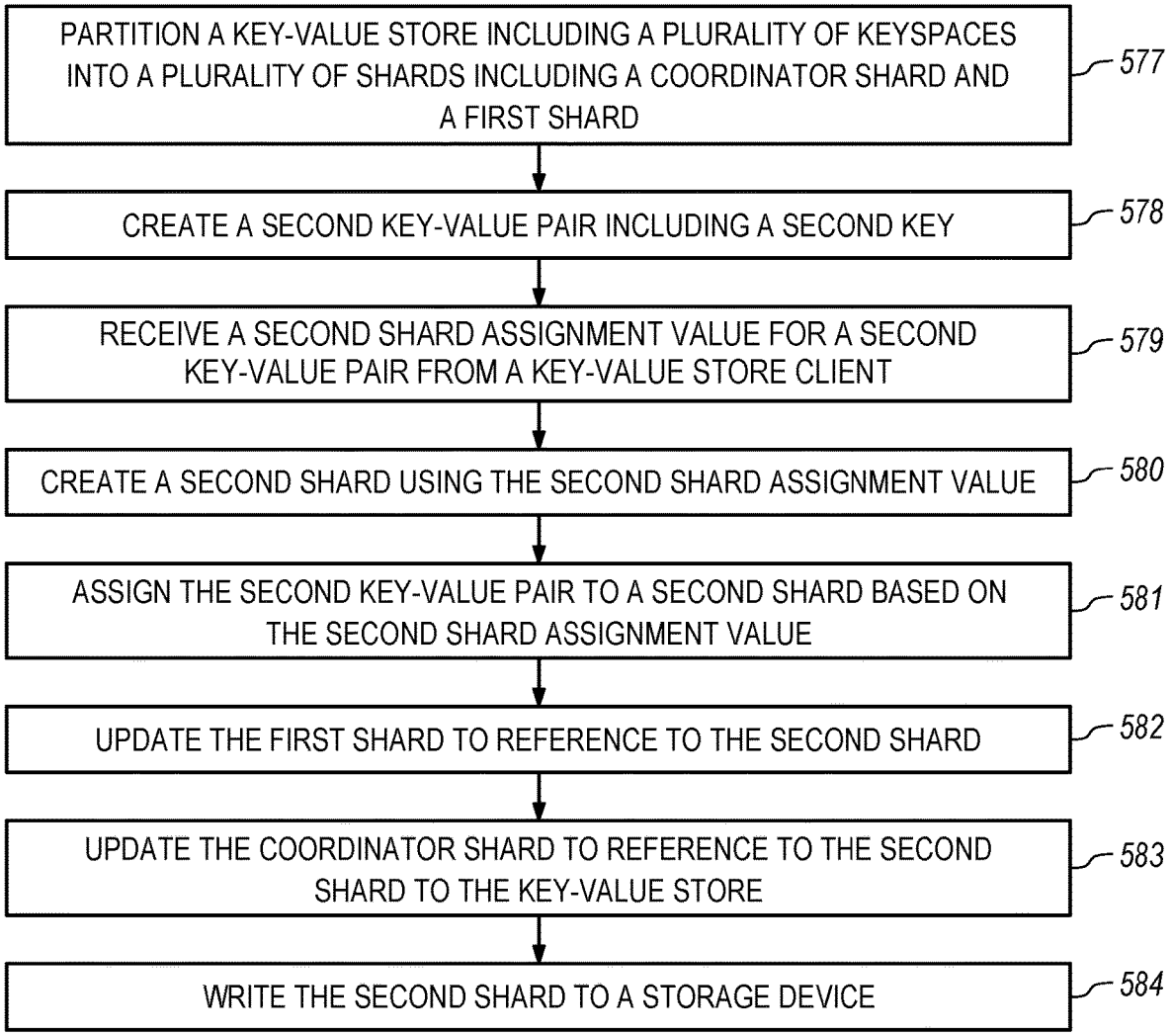

PARTITION A KEY-VALUE STORE INCLUDING A PLURALITY OF KEYSPACES INTO A PLURALITY OF SHARDS INCLUDING A COORDINATOR SHARD AND A FIRST SHARD — 577

CREATE A SECOND KEY-VALUE PAIR INCLUDING A SECOND KEY — 578

RECEIVE A SECOND SHARD ASSIGNMENT VALUE FOR A SECOND KEY-VALUE PAIR FROM A KEY-VALUE STORE CLIENT — 579

CREATE A SECOND SHARD USING THE SECOND SHARD ASSIGNMENT VALUE — 580

ASSIGN THE SECOND KEY-VALUE PAIR TO A SECOND SHARD BASED ON THE SECOND SHARD ASSIGNMENT VALUE — 581

UPDATE THE FIRST SHARD TO REFERENCE TO THE SECOND SHARD — 582

UPDATE THE COORDINATOR SHARD TO REFERENCE TO THE SECOND SHARD TO THE KEY-VALUE STORE — 583

WRITE THE SECOND SHARD TO A STORAGE DEVICE — 584

*FIG. 5*

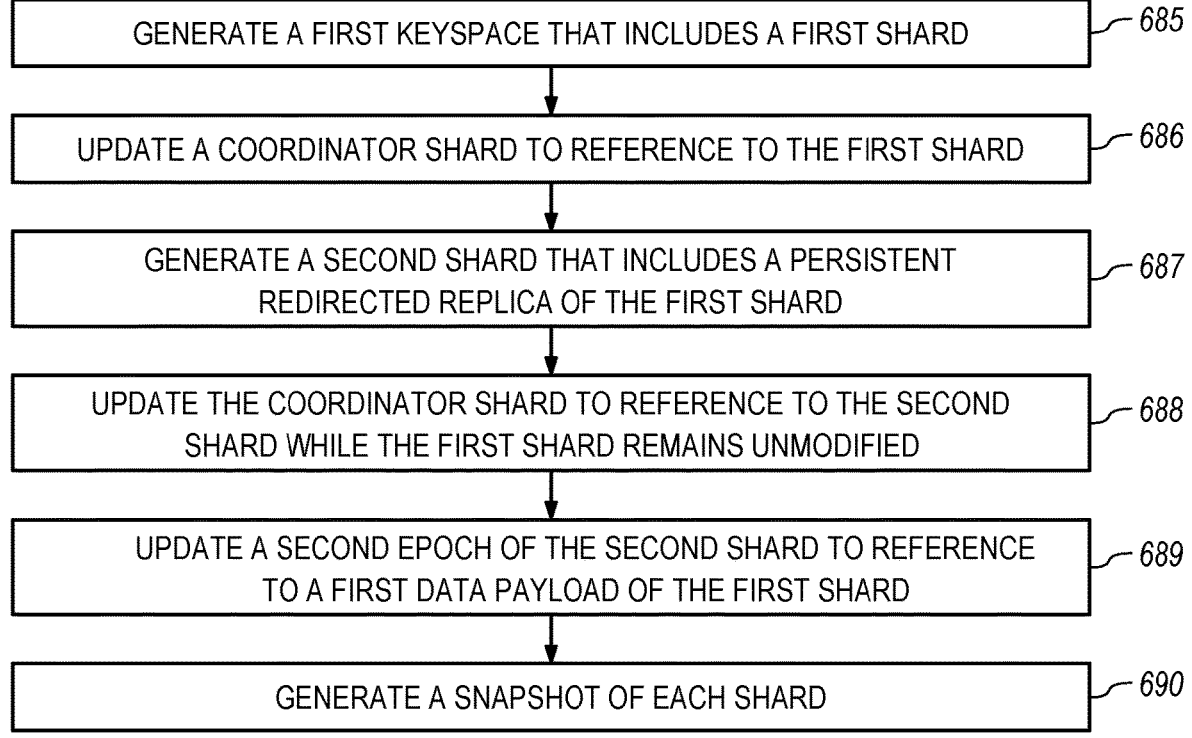

GENERATE A FIRST KEYSPACE THAT INCLUDES A FIRST SHARD — 685

UPDATE A COORDINATOR SHARD TO REFERENCE TO THE FIRST SHARD — 686

GENERATE A SECOND SHARD THAT INCLUDES A PERSISTENT REDIRECTED REPLICA OF THE FIRST SHARD — 687

UPDATE THE COORDINATOR SHARD TO REFERENCE TO THE SECOND SHARD WHILE THE FIRST SHARD REMAINS UNMODIFIED — 688

UPDATE A SECOND EPOCH OF THE SECOND SHARD TO REFERENCE TO A FIRST DATA PAYLOAD OF THE FIRST SHARD — 689

GENERATE A SNAPSHOT OF EACH SHARD — 690

*FIG. 6*

SYSTEM AND METHOD FOR KEY-VALUE SHARD CREATION AND MANAGEMENT IN A KEY-VALUE STORE

RELATED APPLICATIONS

This application claims priority to U.S. Provisional Application Ser. No. 63/456,524, filed on Apr. 2, 2023 and entitled "SCALABLE DATA STORAGE SYSTEMS AND METHODS," U.S. Provisional Application Ser. No. 63/456,762, filed on Apr. 3, 2023 and entitled "SCALABLE DATA STORAGE SYSTEMS AND METHODS," and U.S. Provisional Application Ser. No. 63/592,863, filed on Oct. 24, 2023 and entitled "SCALABLE DATA STORAGE SYSTEMS AND METHODS," the entireties of which are hereby incorporated herein by reference.

BACKGROUND

End users of data storage products are required to manage and store rapidly growing volumes of data in data storage systems. Many of these data storage systems are built on proprietary hardware running proprietary software. The proprietary nature of these systems makes it difficult and expensive to upgrade to achieve better system performance because changing one component within the tightly integrated hardware and software cluster has a cascading effect that becomes time and cost-prohibitive. As a result, many data storage systems are running on outdated, purpose-built hardware, which results in sub-par system performance. Looking to the future, with the intensive computing capabilities promised by innovations such as artificial intelligence and machine learning, these shortcomings become even more critical. It is, therefore, desirable to design a data storage software suite capable of achieving these optimizations, not only today but over time as optimizations evolve, running on a wide variety of scalable data storage hardware platforms.

SUMMARY

The present invention is directed toward a method for key-value shard creation and management in a key-value store. In various embodiments, the method includes the steps of partitioning the key-value store including a plurality of keyspaces into a plurality of shards, the plurality of shards including a coordinator shard, receiving a first shard assignment value for a first key-value pair from a key-value store client, the key-value store client having access to the key-value store, creating a first shard using the first shard assignment value, the first shard including a data structure, assigning the first key-value pair to the first shard based on the first shard assignment value, and updating the coordinator shard to reference to the first shard.

In some embodiments, the method further comprises the step of writing the first shard to a storage device.

In certain embodiments, the method further comprises the step of storing modifications to the first shard in a modified version of the first shard while the first shard remains unmodified.

In various embodiments, the step of storing modifications is completed using a redirected write operation.

In some embodiments, the data structure includes a b+ tree.

In certain embodiments, the first shard includes a first keyspace shard.

In various embodiments, the first shard assignment value is algorithmically determined.

In some embodiments, each shard within the plurality of shards includes logically independent key-values from any other shard within the plurality of shards.

In certain embodiments, each shard within the plurality of shards is independently modifiable from any other shard within the plurality of shards.

In various embodiments, the method further comprises the step of generating a second shard that includes a persistent redirected replica of the first shard.

In some embodiments, the second shard includes a second shard epoch that references to a first data payload of the first shard.

In certain embodiments, the method further comprises the step of updating the coordinator shard to reference to the second shard.

The present invention is also directed toward a method for key-value shard creation and management in a key-value store. In various embodiments, the method includes the steps of partitioning the key-value store including a plurality of keyspaces into a plurality of shards, the plurality of shards including a coordinator shard and a first shard, the coordinator shard referencing to the first shard, the first shard including a first data structure, the first data structure including a first key-value pair, creating a second key-value pair, receiving a second shard assignment value for the second key-value pair from a key-value store client, the key-value store client having access to the key-value store, creating a second shard using the second shard assignment value, the second shard including a second data structure, assigning the second key-value pair to the second shard based on the second shard assignment value, updating the first shard to reference to the second shard, and updating the coordinator shard to reference to the second shard.

In some embodiments, the method further comprises the step of writing the second shard to a storage device.

In certain embodiments, the method further comprises the step of storing modifications to the second shard in a modified version of the second shard while the second shard remains unmodified.

In some embodiments, the step of storing modifications is completed using a redirected write operation.

In certain embodiments, each of the data structures includes a b+ tree.

In various embodiments, the second shard includes a value shard.

In some embodiments, the second shard assignment value is algorithmically determined.

The present invention is further directed toward a method for key-value shard creation and management in a key-value store. In various embodiments, the method includes the steps of partitioning the key-value store including a plurality of keyspaces into a plurality of shards, the plurality of shards including a coordinator shard, receiving a first shard assignment value for a first key-value pair from a key-value store client, the key-value store client having access to the key-value store, creating a first shard using the first shard assignment value, the first shard including a data structure, assigning the first key-value pair to the first shard based on the first shard assignment value, updating the coordinator shard to reference to the first shard, creating a second key-value pair, receiving a second shard assignment value for the second key-value pair from the key-value store client, creating a second shard using the second shard assignment value, the second shard including a second data structure, assigning the second key-value pair to the second shard based on the second shard assignment value, updating the first shard to reference to the second shard, updating the coordinator shard to reference to the second shard, generating a third shard that includes a persistent redirected replica of the first shard, the third shard including a third epoch that references to a first data payload of the first data structure, and updating the coordinator shard to reference to the third shard.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 4 is a simplified flowchart illustrating a representative operational implementation of a method for creation of a new keyspace shard within the key-value store;

FIG. 5 is a simplified flowchart illustrating a representative operational implementation of a method for adding a new key-value pair to an existing keyspace within the key-value store; and FIG. 6 is a representative operational implementation of a method for cloning of keyspaces within the key-value store.

Figure 1:
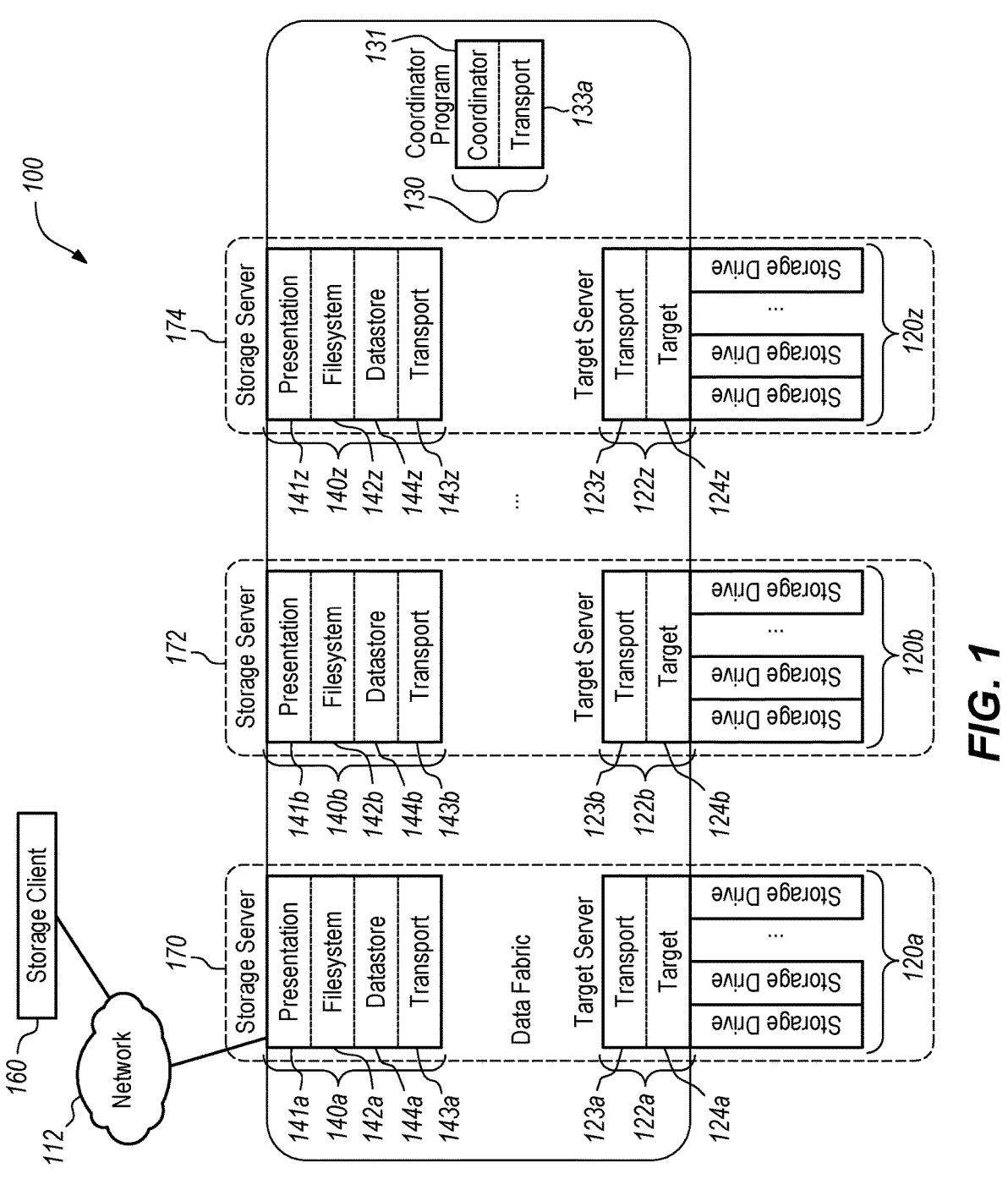
FIG. 1 is a simplified schematic illustration of a representative embodiment of a distributed datastore for scale-out data storage systems having features of the present invention.

While embodiments of the present invention are susceptible to various modifications and alternative forms, specifics thereof have been shown by way of examples and drawings and are described in detail herein. It is understood, however, that the scope herein is not limited to the particular embodiments described. On the contrary, the intention is to cover modifications, equivalents, and alternatives falling within the spirit and scope herein.

DESCRIPTION

Embodiments of the present technology are described herein in the context of systems and methods for key-value shard creation and management in key-value stores, to be utilized efficiently and effectively such that desired tasks can be performed within the storage system in an accurate and timely manner, with minimal waste of time, money and resources. As described in detail in various embodiments herein, the technology of the present application entails incredibly adaptable storage software that is appropriate and multi-functional for an unpredictable future.

More particularly, the technology of the present application provides a valuable solution for unstructured data and is ideally suited for emerging high-growth use cases that require more performance and more scale, including AI and machine learning, modern data lakes, VFX and animation, and other high-bandwidth and high IOPs applications. In certain implementations, the technology of the present application provides an all-flash, scale-out file, and object storage software platform for the enterprise. Leveraging advances in application frameworks and design that were not available even a few years ago, the modern cloud-native architecture of the technology of the present application makes it an easy-to-use solution that overcomes the limitations of hardware-centric designs and enables customers to adapt to future storage needs while reducing the burden on over-extended IT staff.

It is appreciated that the technology of the present application solves these challenges with an all-new scale-out architecture designed for the latest flash technologies to deliver consistent low-latency performance at any scale. It introduces inline data services such as deduplication and compression, snapshots and clones, and metadata tagging to accelerate AI/ML data processing. Additionally, the technology of the present application uses familiar and proven cloud technologies, like microservices and open-source systems, for automating deployment, scaling, and managing containerized applications to deliver cloud simplicity wherever deployed. The software operates on standard high-volume flash storage servers so IT teams can quickly adopt the latest hardware and storage infrastructure for future needs. Thus, by implementing the technology of the present application, enterprises can replace legacy disk-based storage systems with a software-defined, all-flash platform that provides faster performance, greater scale, and a more sustainable and green solution that is both power and real estate efficient.

It is further noted that the conflicts-are-rare assumption, which is incorporated into the functionality of the key-value store of the present technology, is not true of distributed data storage systems in general, necessarily, but is a trend as the advancement of computing hardware makes it more likely to be valid for more and more use cases over time. That advancement is the extremely fast pace of network and storage performance advancement compared to CPU and memory performance advancement. Ethernet speeds of 100G, 200G, and 400G are here, and 800G/1600G is coming soon. Flash and Non-Volatile Memory Express (NVMe) have drastically improved storage performance compared to rotational storage of the past.

Meanwhile, CPUs are only getting faster by adding cores at an incremental rate, and memory performance is comparatively stationary. The net effect of all this is that performing distributed operations on a cluster of computer hardware is becoming faster and faster relative to application performance. As operational latency decreases, the probability of conflicts also decreases, even for a given workload. In a mutual exclusion parlance, the less time spent in the critical region, the less likely there is to be a lock contention.

Those of ordinary skill in the art will realize that the following detailed description of the technology of the present application is illustrative only and is not intended to be in any way limiting. Other embodiments of the technology of the present application will readily suggest themselves to such skilled persons having the benefit of this disclosure. Reference will now be made in detail to implementations of the technology of the present application, as illustrated in the accompanying drawings. The same or similar reference indicators will be used throughout the drawings, and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming. However, it would nevertheless be a routine undertaking of engineering for those of ordinary skill in the art having the benefit of this disclosure.

At a high level, embodiments of the present invention enable myriad efficiencies, which in turn increase speed, reliability, scalability, and flexibility. For example, the custom-built software suite enables at least the following, without limitation:

support for familiar key-value semantics such as GET, PUT, DELETE, SEARCH;

fast atomic transaction support;

copy-on-write cloning support;

support for delta enumeration;

read scalability;

write scalability;

implementation in user space, kernel space, or a combination thereof;

zero-copy functionality;

flexible read caching; and lock-free writing.

The systems and methods disclosed integrate seamlessly into a variety of data storage system architectures, e.g., all-flash, SSD, HDD, and combinations thereof. Embodiments are designed to deliver the same high-performance advantages in a platform-agnostic way. From a data storage operator's perspective, embodiments provide numerous advantages, including without limitation:

reduced expense;

enhanced customer choice and preference options;

reduction in single-source concerns and considerations;

flexibility in growing and evolving storage infrastructure without having to replace an entire storage infrastructure; and enables the use of public cloud IaaS.

It is appreciated by those skilled in the art that logic and algorithms are concepts or ideas that can be reduced to code, which, in turn, can be packaged in modules or libraries. A "library" is a combination of executable computer code (logic) coupled with an interface. Modules and libraries, logic, code, and algorithms can be combined in programs, processes, Kubernetes pods, or servers to perform a specific purpose. Systems include programs, processes, Kubernetes pods, and servers running on nodes, clusters, or clouds to solve a particular problem. In embodiments described throughout, all modules and libraries are able to run in user space, the kernel, or a combination of both.

FIG. 1 is a simplified schematic illustration of a distributed datastore 100 for a scale-out data storage system. Similarly, the datastore is also referred to herein as a "key-value store." For illustrative purposes, some of the hardware aspects of the data storage system have been depicted in FIG. 1 to provide clarity regarding the location of logic modules and libraries as well as the tangible changes affected by those logic modules and libraries on the data storage system.

The distributed datastore 100 includes at least three storage nodes 170, 172, 174. Each storage node 170, 172, 174 includes a storage server 140a, 140b, and 140z, respectively, and a target server 122a, 122b, and 122z. Each of the storage nodes 170, 172, and 174 also has a plurality of storage drives 120a, 120b, 120z, respectively, attached to them. In an embodiment, storage drives 120a, 120b, and 120z include NVMe flash drives, without limitation.

In an embodiment, one or more of storage nodes 170, 172, 174 is a load balancing node used to equally distribute data storage and IOPS within the data storage system. In an additional embodiment, one or more storage nodes 170, 172, 174 is a deployment node used to automate initialization management functions for the data storage system 100. Hardware communication within the data storage system 100 is accomplished among for example, storage nodes 170, 172, 174, over data fabric 150.

The distributed datastore 100 is accessible by a storage client 160 through a network 112. In one embodiment, the storage client 160 can include a Network Attached Server (NAS) server, and storage servers 140a, 140b, 140z can include a NAS server, as one non-exclusive example. The storage client 160 provides connectivity to the data storage system, enabling external clients (not shown) to access the data storage system. External clients can include, without limitation, individual computer systems, enterprises, Artificial Intelligence (AI) modules, or any other configuration enabled to run one or more of the networks 112 to perform typical data storage operations on the data storage system using the distributed datastore 100.

In an embodiment, network 112 is a local area network (LAN). Those of skill in the art will recognize, in additional embodiments, network 112 include, but are not limited to, personal area network (PAN), wireless local area network (WLAN), campus area network (CAN), metropolitan area network (MAN), wide area network (WAN), storage-area network (SAN), system area network (SAN), passive optical local area network (POLAN), enterprise private network (EPN), and virtual private network (VPN). Those of skill in the art will recognize the adaptability of what is taught herein as network development evolves over time.

Storage servers 170, 172, 174 include software modules and libraries used to manage the data storage system. Specifically, presentation layers 141a, 141b, 141z are a module of code stored in local program storage 132. Each presentation layer 141a, 141b, 141z can be configured to operate using a multitude of protocols, e.g., open source, proprietary, or a combination thereof, as non-limiting examples. By way of example, and without limitation, these protocols include Network File System (NFS), Server Message Block (SMB), Amazon Simple Storage Service (S3), and GUI-enabled protocols.

Storage servers 170, 172, 174 also include transport libraries 143a, 143b, 143z. The transport libraries 143a, 143b, 143z enable the transfer of information from point to point within the distributed datastore 100. Transport libraries 143a, 143b, 143z form a communication infrastructure within the data storage system and the distributed datastore 100. Transport libraries 143a, 143b, 143z provide a common API for passing messages between a server and a client endpoint, as those terms are generically used by those skilled in the art.

In one embodiment, transport libraries 143a, 143b, 143z remote direct memory access (RDMA). In another embodiment, transport libraries 143a, 143b, 143z use TCP/UNIX sockets. In embodiments, transport libraries 143a, 143b, 143z allow threads within the distributed datastore 100 to create queues and make connections. Transport libraries 143a, 143b, 143z move I/O requests and responses between initiators and targets. Transport libraries 123a, 123b, 123z, and 133a, perform in the same fashion as described with regard to 143a, 143b, 143z, with one exception. Transport library 133a, which is part of coordinator program 130, is used to facilitate communication-related to the tasks of the coordinator module 131.

Target servers 123a-123z also include storage modules 124a-124z, respectively. Storage modules 124a-224z perform a lock-free multi-queue infrastructure for driving NVMe flash drives 120a-120z.

The coordinator program 130 includes a transport library 133a as well as a coordinator module 131. In an embodiment, the coordinator module 131 is a coordinator shard, which is updated by the coordinator module 131. While FIG. 1 depicts a single coordinator module 131, in some embodiments, there are sub-coordinator modules working hierarchically under the direction of the lead coordinator module 131. The coordinator module 131, either on its own or in conjunction with the datastore library 144a-144z, performs several data storage 100 management functions, including without limitation:

conflict resolution for operations such as writing data to the data storage system 100;
    allocating space on NVMe flash drives 120a-120z for writing data;
    determining a data redundancy scheme for data when it is written;
    coordinating data stripe length and location;
    supporting lock-free writing for data;
    tracking data storage location;
    coordinating access permissions for data reads, such as what data can be accessed by which storage client 160 or ultimate end-user;
    data compaction, also referred to by those skilled in the art as garbage collection; and
    coordinate data write permissions, such as what data can be written by which storage client 160 or ultimate end user.

The datastore library 144a-144z, either on its own or in conjunction with the other modules and libraries within the distributed datastore 100 performs several data storage 100 management functions, including without limitation:

erasure encoding data;
    encrypting data;
    data deduplication;
    compaction, also called garbage collection;
    determining a delta enumeration of data snapshots; and
    data compression.

In an embodiment, the datastore library 144a-144z implements a key-value store having a plurality of keyspaces, each keyspace having one or more data structure shards. In an alternate embodiment, the data store library 144a-144z library implements a key-value store having a plurality of keyspaces, each keyspace having one or more b+ tree shards. In one embodiment, the datastore library 124a-124z is an object storage database. In another embodiment, the datastore library 144a-z is a NoSQL database. In an embodiment, the datastore library 144a-144z is a distributed, coherent key-value store specialized for applications like a filesystem library 142a-142z.

In some embodiments, erasure encoding is a process involving writing data into zones and zone sets wherein the data is written in a distributed fashion in data stipes according to a data redundancy scheme. In embodiments, data is written in a loc-free fashion.

By way of background, a file system is a recursive structure of directories, also called "folders," used to organize and store files, including an implicit top-level directory, sometimes called the "root directory." Any directory in a file system can contain both files and directories, the number of which is theoretically without limit. Both directories and files have arbitrary names assigned by the users of the filesystem. Names are often an indication of the contents of a particular file.

Filesystems store data often at the behest of a user. Filesystems also contain metadata such as the size of the file, who owns the file, when the file was created, when it was last accessed, whether it is writable or not, perhaps its checksum, and so on. The efficient storage of metadata is a critical responsibility of a filesystem. The metadata of filesystem objects (both directories and files) are stored in inodes (short for "information nodes"). Inodes are numbered, which is all that is required to find them, and there are at least two types of inodes: file inodes and directory inodes.

A file inode contains all metadata that is unique to a single file-all of the data listed above, and potentially many more, notably including an ordered list of blocks or extents where the data can be found. A directory inode contains metadata that is unique to a single directory-items such as who can add files or subdirectories, who can search the directory (e.g., to find an executable file), and notably, all of the names of the files, and subdirectories in the directory, each with its inode number.

With this abstraction, a filesystem basically comprises two kinds of data: inodes, which contain information about directories, and data files. Filesystems also contain information about the relationships between inodes and data files. Data files are typically written in data blocks, which are fixed size, or as data extents, variable length. The inodes store all of the metadata for all objects in the filesystem. Turning to filesystem library 142a-142z, in one embodiment, filesystem library 142a-142z is implemented as an application of a datastore library 144a-144z.

FIG. 1 depicts the distributed datastore 100 as being a unified collection of logic modules, libraries, storage, and interconnecting fabric. In alternate embodiments, each individual logic module or library within the distributed datastore 100 could be distributed across various interconnected hardware components, such as storage client 160 or other hardware devices connected to network 112, e.g., an individual computer system, a machine learning module, an AI module, and enterprise, a cloud, and the like. Those of skill in the art will recognize the infinite possibilities for distributing the components of the distributed, scale-out data storage system across myriad software, hardware, and firmware configurations.

Figure 2:
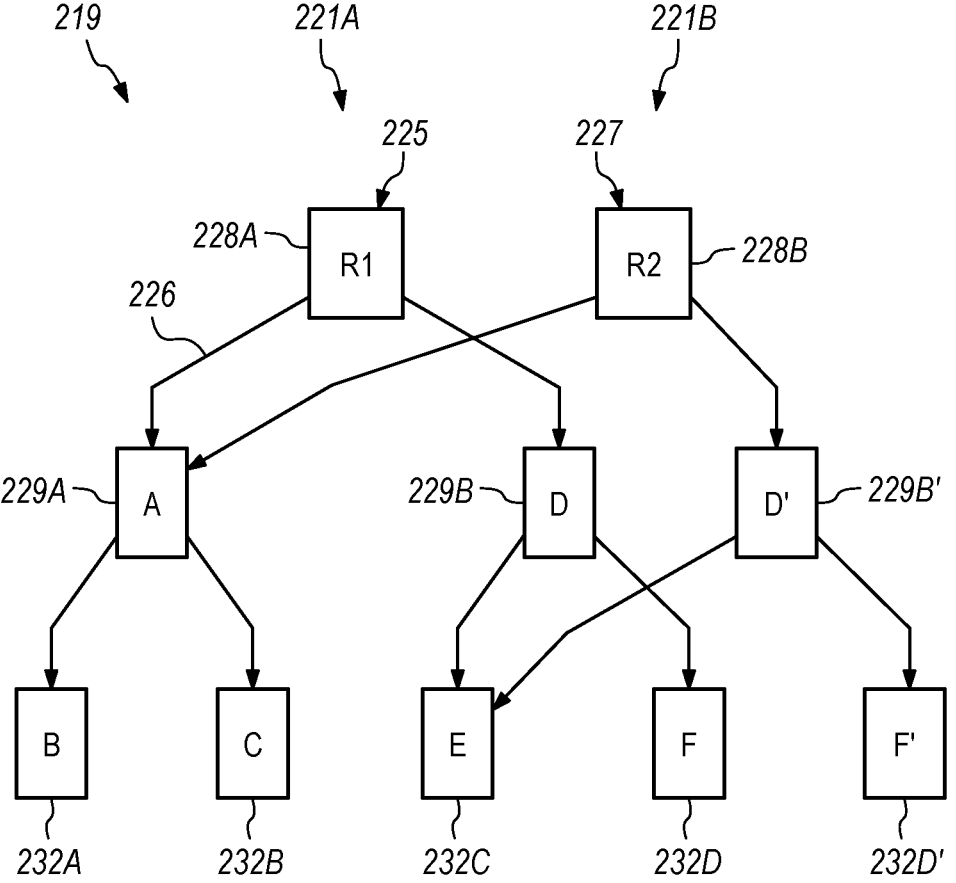
FIG. 2 is a simplified schematic illustration of a representative embodiment of a key-value store including two value shards.

FIG. 2 is a simplified schematic illustration of a representative embodiment of a key-value store 219, including two value shards, a value shard 221A, and a modified value shard 221B. The value shard 221A includes an extant b+ tree 225, and the modified value shard 221B includes a modified b+ tree 227. The value shard 221A and the modified value shard 221B are each logically partitioned onto the key-value store. While b+ trees 225, 227 are shown and described in the embodiment illustrated in FIG. 2, it is appreciated that the shards 221A, 221B can include any suitable data structure.

A domain of unique names is often referred to as a namespace. For example, a file system such as the C: drive on a Windows computer is often called a namespace. In the datastore, a domain of unique key-value keys can be referred to as a keyspace, to avoid further overloading the namespace terminology. The keyspace has a set of shards (sometimes also referred to as a "keyspace shard"), and each key-value pair in a keyspace is assigned to a shard using a shard assignment value. Each keyspace shard includes a b+ tree 225 where the entries are pointers to its shard roots. The coordinator b+ tree entries point and/or references to the root nodes of the keyspace b+ tree roots.

In embodiments, the storage topology inside the key-value store 219 is the b+ tree 225. In practice, the b+ trees 225, 227, thousands to millions of them, are referred to as shards 221A, 221B. Each shard 221A consists of one or more b+ tree nodes, payloads holding the key-value value data, and an epoch record that holds the address of the root. The key-value keys are the b+ tree shard keys. So, a b+ tree shard is essentially a data structure for mapping key-value keys to key-value values and storing all of that on a log. The epoch records are stored in mirroring protected quorum zoneset. The term "shards" used herein can refer to coordinator shards, keyspace shards, and/or value shards, unless otherwise specified.

As illustrated in FIG. 2, the extant b+ tree 225 includes a root node 228A (labeled with "R1"), a pair of branch nodes 229A and 229B (labeled with "A" and "D," respectively), and four, leaf nodes 232A, 232B, 232C, 232D (labeled with "B," "C," "E," and "F," respectively). As referred to herein, any of the branch nodes 229A, 229B, and/or the leaf nodes 232A, 232B, 232C, and 232D can be referred to individually or collectively as nodes.

As noted above, the b+ trees 225, 227 can include any suitable number of layers of branch nodes 229A, 229B, and/or leaf nodes 232A, 232B, 232C, and 232D that are coupled to and/or extend from the root node 228A. In this simplified version, the b+ trees 225, 227 include only two layers of nodes that are coupled to and/or extend from the root node 228A. In alternative embodiments, the b+ trees 225, 227 can include more than two layers of nodes or only a single layer of nodes that are coupled to and/or extend from the root node 228A.

As further noted above, each layer of nodes can include any suitable number of nodes. More particularly, in alternative embodiments, each layer of nodes can include more nodes or fewer nodes than what is specifically shown in FIG. 2. Every shard 221A, 221B, disclosed herein includes a b+ tree 225 that is written onto storage in a redirected, copy-on-write operation.

Shards, such as the value shard 221A, are manipulated in a copy-on-write operation. The epoch is in a known location, and that tells us the log address of the root node 228A. From there, readers can descend the b+ tree 225 for reads in the usual way, reading content off the log as needed with impunity to writers since nothing is replaced in place. Therefore, there are no b+ tree node locks or coordination about who is using the same b+ tree 225 at the same time.

When writing, all the nodes are copied, starting from the root node 228A, down to leaf nodes 232A, 232B, 232C, and 232D that may be modified, and then add new payloads as needed to point to in the leaf nodes 232A, 232B, 232C, and 232D. Therefore, every modification of a b+ tree 225 results in appending some more data to the log, and does not damage the version of the b+ tree 225 that was there originally. Until the epoch has been updated to point at a new root node 227B, no other client of the key-value store 219 is capable of viewing the changes that were made. At that point, some space is allocated, and some data is written that is not referenced anywhere. Write operations may happen at the same time as another node, to the same b+ tree shard, other key-value 219 store clients would not be able to see those write operations.

It is in this way that the key-value store 219 clients can obey the "no rewriting" rule. The key-value store 219 allocates space for clients. Client write their own modifications into that space, and other clients cannot see the written changes until after the write I/O is complete, so another client will be able to read it. Once another client does read it, they can cache it forever, because the key-value store 219 will never change it in the same place. Every time a b+ tree shard 221A is modified, the old version of the b+ tree shard 221A is left behind, accumulating more data as time advances.

To illustrate this, in the simplified drawing of FIG. 2, an operation was performed to the modified shard 221B that added a new leaf node 232D' and resulted in a new root node 228B (labeled with "R2"). More specifically, the operation created a new leaf node 229D' (labeled with "F"), which contains the new entry to the original root node 229D (labeled with "F"). Subsequently, the operation, in turn, created a modified branch node 229B' (labeled with "D") which replaces the original branch node 229B (D node), and replaces a reference to the old branch node 229B (F node) with a reference to the new leaf node 232D' (F' node). Finally, the operation further created the new root node 228B (R2 node), which replaces the original root node 228A (R1 node) and replaces the reference to the old branch node 229B (D node) with a reference to the modified leaf node 232D' (D' node).

References are shown in FIG. 2 as pointers 226 in the form of a plurality of arrows. The pointers 226 indicate the reference from the higher-tier node (e.g., a root node 228A to a branch node 229A and a branch node to a leaf node). Thus, the new modified version of the b+ tree 227 includes the root node 228B (R2 node), a pair of branch nodes 229A, 229B' (labeled with "A" and "D" respectively), and four, leaf nodes 232A, 232B, 232C, 232D' (labeled with "B," "C," "E," and "F" respectively).

As a result, if a reader can perform an operation using either the original root node 228A (R1 node) or the new root node 228B (R2 node), and the only difference is if they use the new root node 228B, they will see the new entry in the new leaf node 232D' (F' node). Otherwise, they will not. As a result, this can be referred to as a "redirected write scheme" because modifications to the extant b+ tree 225 are not made in-place to existing contents but are instead redirected to new copies in entirely separate shards (e.g., the value shard 221A and the modified valued shard 221B).

As described, the redirected write scheme incorporates two convenient characteristics for use within the systems and methods of the technology of the present application. In particular, a reader is free to read any content reachable from a given b+ tree root node 228A while the b+ tree 225 is being concurrently modified without fear of seeing incomplete content or dangling references. This is because any modifications that occur are redirected into new b+ tree roots 228B and sub-nodes (such as the branch nodes 229B', the leaf nodes 232D', etc.) that are unreachable from prior copies of the root node. Multiple writers can make modified versions of the b+ tree 225 simultaneously without coordination, provided they do not care about seeing each other's changes. Each will create a new, different b+ tree root 228B that is possibly divergent.

Figure 3:
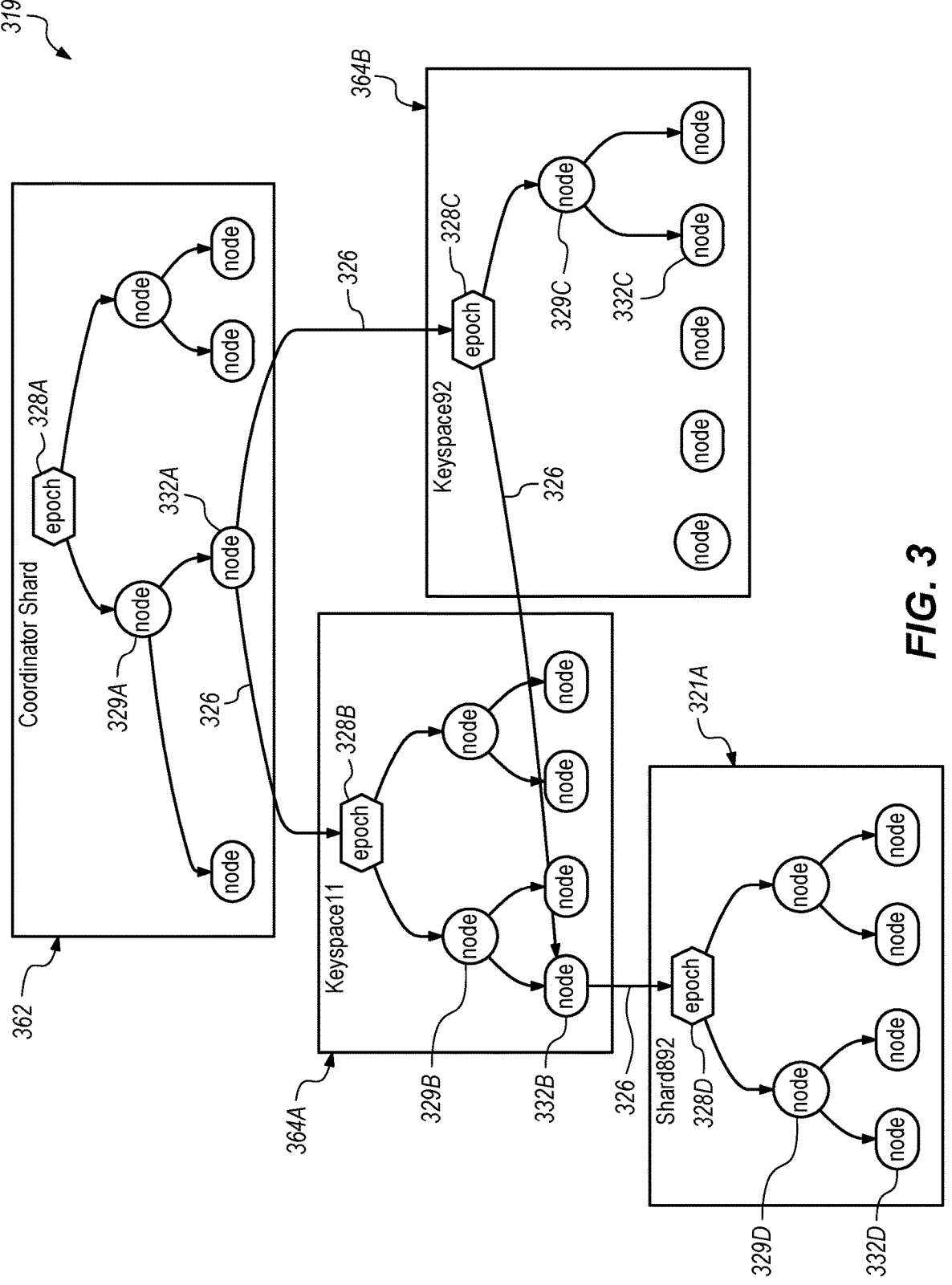
FIG. 3 is a simplified schematic illustration of a representative embodiment of a key-value store, including a coordinator shard, a plurality of keyspace shards, and a value shard.

FIG. 3 is a simplified schematic illustration of a representative embodiment of a key-value store 319, including a coordinator shard 362, a plurality of keyspace shards (including a first keyspace shard 364A and a second keyspace shard 364B), and a value shard 321A. The value shard 321A can be substantially similar to the embodiment of the value shard 221A shown with respect to FIG. 2. As used herein, "first," "second," "third," etc., when used to describe elements, steps, or any features of the present technology, is not intended to be limiting, and it is appreciated that the elements, steps, or features of the present technology could be presented herein in any suitable order and in any suitable number. For example, while the keyspace shards 364A, 364B are referred to in FIG. 3 as the first keyspace shard 364A and the second keyspace shard 364B, it is understood that the numbering terminology can be swapped and that the first keyspace shard 364A could also be the fourth, fifth, or sixth, etc. keyspace shard of a plurality of keyspace shards in a different context.

The current state of any of the root nodes 328A-D described and shown herein can also be referred to as "epochs." An epoch describes the location of a corresponding shard in storage. For example, the current epoch of the value shard 321A. If any changes were made to the value shard 321A, this would result in the epochs changing in each of the coordinator shard 362, the first keyspace shard 364A, and the second keyspace shard 364B, because each of these shards references the value shard 321A. As opposed to the traditional use of the term epoch, as used herein, "epochs" refer to equality of shards or the lack thereof. There is no sense of ordering with respect to the epochs described herein, merely whether there is a disparity in the location provided in an epoch and the actual location of the value shard 321A on storage.

The coordinator shard 362 is usable with the present technology to make changes to the shards within a system. For example, as leaf nodes 329A-D are added to the key-value store via redirected writing operations, the coordinator shard 362 tracks and references all of these changes from the root node 328A of the coordinator shard. An individual keyspace shard (e.g., the first keyspace shard 364A) will also track and reference any changes to the value shard 321A that is referenced by the first keyspace shard 364A. In various embodiments, the coordinator shard 362 includes a coordinator root node 364 that is configured to reference any suitable shards within the key value store 319.

The coordinator shard 362 can be designated as a coordinator or a coordinator of the key-value store 319. The coordinator shard 362 coordinates all writing transactions within the key-value store 319. The coordinator shard 362 controls and arbitrates all manipulation of the key-value store 319, including references to all other shards 321A, 364A, 364B therein.

There can only be one coordinator shard 362 in the key-value store 319 at any given time. More than one coordinator shard 362 in a key-value store 319 would result in data corruption. However, if there are no coordinator shards 362 in a key-value store, no data transactions within the key-value store 319 can be processed. Once an updated version of a b+ tree shard is written to storage, the corresponding epoch of the keyspace shard must be updated. The coordinator shard 362 the coordination of writing functions in the key-value store 319. The coordinator shard 362 can be written to a mirroring protected, master zoneset. While the other normal shards map key-value keys to key-value values, the coordinator shard 362 maps shard assignment values to shard roots nodes. For example, to know the current root of shard 24 on log 3, the coordinator shard 362 must be queried. To update shard 24 on log 3, the coordinator shard 362 coordinates the creation of a copy-on-write modification of the coordinator shard 362, as described herein.

The coordinator shard 362 cannot be modified by multiple clients of the key-value store 319 at the same time. To counteract this, one client is designated the coordinator at a time and the coordinator client is the only key-value store client that is allowed to write to the coordinator shard 362. The coordinator client then listens over the transport for commit requests from other key-value store clients.

During a commit request, the coordinator client will check the coordinator shard 362 to see if the current root is the same value as prior to the commit request, and if so, the coordinator shard 362 will change it to the commit request value and reply to the key-value store client that the commit has succeeded. Otherwise, if another key-value store client has already modified the same shard since the original one began its transaction, the coordinator client will reply that the commit has failed, due to a conflict.

Therefore, key-value clients always perform their modifications at risk. At risk, meaning that, without knowledge if they are racing other key-value store clients trying to modify the same shard at the same time. If it turns out they are racing someone else, and they lose, they'll only find out about it after they've written their transaction to the logs and have received a failure from their attempt to commit. Therefore, all key-value store application code that performs write transactions must be formatted as a retry loop.

The coordinator shard 362 opens a transaction, which gives a static view of the key-value store 319 at that time, the coordinator shard 362 checks that the world is in a state that it desires, and then the coordinator shard 362 makes changes and try to commit. If a key-value store client loses a race, the world has changed, so the coordinator shard 362 must do its checks again.

The coordinator client and coordinator shard 362 of the key-value store 319 are scalable. While only the coordinator client is allowed to write to the coordinator shard 362, any key-value store client can read the coordinator shard 362. Therefore, when key-value store clients merely perform a read transaction, they need not communicate with the coordinator client at all. The other key-value store clients go to the coordinator shard 362, get the desired data shard root pointer that the key-value store client needs, and proceed with the read transaction. The read transaction only needs to be performed if the key-value store client needs a guarantee of seeing the latest state of the data (e.g., referred to herein as the "latest state of the world."). If the key-value store client does not need to see the latest state of the data, the key-value store client can cache the root pointer values it can already see. Further, if the key-value store caches all b+ tree nodes in the previously mentioned cache, any nodes that remain unchanged moment to moment can be honored from the cache without checking if they are still valid. The key-value client infers that the cache use is operable because those cache addresses have been referenced by a coordinator shard 362 pointer that the key-value client presumes to be operable.

It is, therefore, only in write transactions that the coordinator client creates a potential bottleneck. Every write transaction must send a message to the coordinator client and wait for it to respond before proceeding, and that has a latency cost. Additionally, there is some limit on the number of such messages per second the coordinator client can handle, and the limit becomes a hard stop on achievable overall write performance.

The issues with these write transaction concerns can be mitigated in the following ways:

The size of the commit messages can be configured to be small. Transactions typically only modify 1-3 shards, so a commit message is generally well under 100 bytes.

Key-value store clients can send these commit messages to the coordinator client, and receive the responses from the coordinator client, using RDMA transfers. Thus, the RPC roundtrip time can be as low as 2 or 3 microseconds.

The coordinator shard 362 is not large. Since it only contains the shard root pointers, and there are, at most, millions of them, the entirety of the coordinator shard data is a handful of megabytes. Therefore, while these manipulations of the coordinator shard tree must be performed serially by a single thread, that thread can be fast because it handles cheap messages that it can honor by looking only at data that fits in the CPU cache. A single thread can handle millions of such messages per second. The low amount of state also means the coordinator client can be failed over to a different key-value store client virtually instantly, especially so if the fail-over recipient is already primed and ready to take up the job.

The coordinator client can pipeline and batch the processing of the commit messages within the coordinator client. Each time a change is made to the coordinator shard 362, there needs to be a flush out to persistent storage to ensure it remains durable. The coordinator client does not need to do that once-per-commit-message, however. The coordinator client can handle a big batch of commit messages, flush them, and then wait to acknowledge them until the flush completes while processing the next batch. As such, the number of I/O round trips to the coordinator zoneset can be much less than the number of commit messages that are processed, and the coordinator client can keep a high queue depth on the coordinator zoneset.

The coordinator client can perform batch delegation. Suppose the coordinator client can handle at most ten million commit messages per second. If the system wants to achieve a higher than ten million commits per second total system throughput rate, the system can add a set of "sub-coordinator clients." A sub-coordinator client accepts commit messages from other clients, checks them for conflicts with each other, then writes that to the coordinator zoneset and tries to commit the result to a "real coordinator client." As such, each commit that the coordinator client has to process itself represents a pre-checked batch of commits, and the system can add any number of such layers to scale out the aggregate commit handling as much as needed.

To protect against failure of the coordinator client itself, the coordinator zoneset is itself mirrored and spread across different nodes. If one target node containing the coordinator zoneset volume dies, it could still recover from the mirrored volume.

In the simplified illustration of FIG. 3, only two keyspace shards 364A-B (each having a root node 328A-B) are shown as being referenced by the leaf node 329A of the coordinator shard 362, and one value shard 321A (having a root node 328D) is referenced by a leaf node 329B of the first keyspace shard 364A. In practice, there would be many keyspace shards 364A, 364B, and each would contain many value shards, and the shards would contain many branch nodes 329A-B and leaf nodes 332A-D when compared to branch and leaf nodes of the coordinator shard 362.

The keyspace shards 364A, 364B are containers for key-value pairs. The key-value store 319 includes one or more keyspace shards 364A, 364B, each containing a logically independent domain of key-value pairs. The keyspace shards 364A, 364B are created and destroyed as operations within a transaction of the key-value store 319. Transactions may operate atomically on key-value pairs from multiple keyspace shards 364A, 364B if desired.

Each of the keyspace shards 364A, 364B is identified by a unique 128-bit ID number chosen by the application. This shard ID is also referred to as the shard assignment value herein. The ID of a keyspace shard 364A encodes the ownership of the keyspace shards 364A in terms of the coordinator shard 362 which is in charge of it. There are APIs to create keyspace shard assignment values, which can either generate the whole keyspace shard assignment value, or factor in an external seed and build a keyspace shard assignment value. The returned keyspace shard assignment value from the function will identify the corresponding coordinator shard 362. In the case of the seed call, the passed-in keyspace shard assignment value is used as the base. Part of it can be overwritten to represent the coordinator shard 362.

The keyspace shards 364A, 364B can be local or shared. A local keyspace shard 364A is backed by cache storage and only visible from a single function context. However, when creating a local keyspace shard 364A, the existence of the keyspace shard 364A is tracked in the shared storage. The local keyspace shard 364A is intended for short-term use to accumulate a set of changes before committing them to the shared storage.

The keyspace shards 364A, 364B can be destroyed so that they no longer exist on the key-value store 319. A keyspace destroy function queries the keyspace shard assignment value associated with the keyspace shard 364A and then destroys the keyspace shard 364A.

The keyspace shards 364A, 364B can be cloned. In FIG. 3, the second keyspace shard 364B is depicted as a clone of the first keyspace shard 364A. A keyspace shard 364A can be cloned to a keyspace shard 364B that is shared from the same coordinator shard 362 or to a local shard. A local keyspace shard 364A can be cloned to a new local keyspace (not shown), but a local keyspace cannot be cloned to a shared keyspace shard, such as the first keyspace shard 364A. Cloning keyspace shards 364A, 364B in the key-value store 319 includes a copy-on-write, constant-time operation that does not duplicate any data. The second keyspace shard 364B (or any cloned keyspace shard) will contain the same key-value pairs as the first keyspace shard 364A (or any original keyspace shard that is the subject of a cloning operation) but any modifications that are made to either of the keyspace shards 364A, 364B will be logically independent from each other in all future transactions. In other words, the second keyspace shard 364B can be referred to as a "writable snapshot" of the first keyspace shard 364A.

During a single transaction of the key-value store 319, it is possible to create, destroy, and clone multiple keyspace shards 364A, 364B within a single transaction, as well as put objects into newly created keyspace shards 364A, 364B in the transaction which created them.

Each of the keyspace shards 364A, 364B is a logically independent domain of keys with its own shards. Therefore, transactions that modify different keyspace shards 364A, 364B cannot conflict with each other, even if they modify keys with the same key-prefix, because each transaction will be touching different shards belonging to the corresponding keyspace shards 364A, 364B.

Similarly, within a given keyspace shard 364A, each pool is a logically independent domain of keys with its own shards. In other words, the same key may exist in multiple pools within one keyspace shard, or in the same pool within different keyspace shards. In some embodiments, in a given keyspace pool, each of the keys are required to be unique. As a result, if a new key-value pair is added to a keyspace pool where another key-value pair with the same key already exists, the existing key-value pair will be replaced with the new key-value pair.

In other embodiments, the coordinator shard 362, the first keyspace shard 364A, the second keyspace shard 364B, and the value shard 321A can initially be formed into one monolithic data structure having one shard. The singular monolithic data structure (e.g., a single b+ tree) can then be separately sharded into the coordinator shard 362, the first keyspace shard 364A, the second keyspace shard 364B, and the value shard 321A as shown in FIG. 3.

FIG. 4 is a simplified flowchart illustrating a representative operational implementation of a method for creation of a new keyspace shard within the key-value store. It is appreciated that the listing of the steps as recited in relation to FIG. 4 can be modified from what is specifically described herein. More specifically, the order of the recited steps can be changed, any steps can be combined or omitted, or more steps can be added to the specific steps noted herein, provided the resulting flowchart does not stray from the general teachings provided herein. Additionally, the steps shown and described with respect to FIG. 4 can be combined with steps from other methods shown and described herein (e.g., FIGS. 5 and 6).

In many embodiments, the methods taught herein can be implemented using a key-value store 319 (as illustrated in FIG. 3) and the scalable data storage system, or any suitable data storage system. More particularly, as noted above, storage nodes of the scalable data storage system can include a non-transitory computer-readable storage medium for storing computer-executable instructions that, when executed by a computer, cause the computer to perform a method for redirected writing of data on a data structure within the data storage system. The method can thus include the various steps as recited specifically herein in relation to FIGS. 4, 5, and 6.

At step 470, a key-value store, including a plurality of keyspaces, is portioned into a plurality of shards. The plurality of shards can include a coordinator shard, a keyspace shard, and a value shard. The key-value store can be sharded into many smaller shards. Each of these shards can include a portion of a plurality of key-value pairs.

At step 471, a first shard assignment value is received for a first key-value pair from a key-value store client, the key-value store client having access to the key-value store. The shard assignment values described herein are also referred to as "shard IDs." The shard assignment values can be algorithmically determined by the key-value store client. The shard assignment value can be used as a tool for balancing the collocation of information and the probability of collisions within the key-value store, thereby increasing the overall efficiency of the key-value store. It is recognized that any suitable algorithm can be used to determine the shard assignment values disclosed herein.

At step 472, a first shard is created using the first shard assignment value. In some embodiments, the first shard includes one of a first keyspace shard and a value shard. The first shard can include one of a b+ tree, a probabilistic data structure, or any suitable data structure. Each shard within the plurality of shards includes logically independent key-values from any other shard within the plurality of shards.

At step 473, the first key-value pair is assigned to the first shard based on the first shard assignment value. In some embodiments, the key-value store client can use a shard assignment value, including a key composed of several pieces of data, including an inode number. For example, the shard assignment value could include the inode number "modulo 4096." In other embodiments, the shard assignment value could be used to deduplicate data by assigning the shard assignment value that is based on a cryptographic hash of a value (i.e., a value of the key-value pair) modulo of some large number, e.g., 100000. Such a choice would, over time, result in 100000 shards, each containing some number of unique pieces of data.

At step 474, the coordinator shard is updated to reference to the first shard. Pointers of the coordinator shard will be updated to point to the first shard.

At step 475, the first shard is written to the storage device.

At step 476, modifications to the first shard are stored in a modified version of the first shard while the first shard remains unmodified. The step of storing modifications is completed using a redirected write operation.

As utilized herein, the key-value store (also referred to herein as a "datastore") is a type of data storage software program that is configured for storing, retrieving, and managing collections of data. In various implementations, the key-value store includes a plurality of key-value pairs. Each key-value pair includes one or more data objects, or data, which can include any suitable type of data, and which encompass the value portion of the key-value pair, and an associated key, which is used to identify the data of the particular key-value pair and/or the location of such data. Thus, the key provides a unique identifier for the data of the key-value pair.

The key can be any suitable type of identifier, depending upon any limitations that may be imposed by the relevant software program. However, it is appreciated that the key should be unique within the database so there is no ambiguity when searching for the data (or value) from its corresponding key. In certain embodiments, the key-value store can be configured using a single key-value store configuration file, represented in JSON. The key-value store configuration file configures the storage to be used, the sizes of the caches, and various other parameters of the key-value store.

The key-value store can be used in contrast to a traditional relational database design, where data is stored in tables composed of rows and columns. For traditional relational databases, the database developer specifies many attributes of the data to be stored in the table upfront. This creates significant opportunities for optimizations such as data compression and performance around aggregations and data access, but also introduces some inflexibility. On the other hand, key-value stores are typically much more flexible and offer very fast performance for reads and writes, partly because the database is looking for a single key and is returning its associated value rather than performing complex aggregations.

Because placeholders or input parameters do not represent optional values, as in most relational databases, the key-value store often uses far less memory to store the same data, which can lead to large performance gains in certain workloads. The key-value store is also highly partitionable and allows horizontal scaling at scales that other types of databases cannot achieve.

Therefore, the datastore has been built into the present architecture as a distributed, transactional key-value store that is specifically optimized for a distributed data storage system in which global transactional guarantees are required but in which actual transactional conflicts are relatively rare. The datastore is designed in such a way that it could be suitable for any distributed data storage system for which that assumption is true, including, for example, a POSIX file system. The key-value store can include an unstructured key-value mapping table.

All operations within the key-value store occur within a transaction. Basic operations such as reading existing data or writing new data are communicated via the coordinator shard. In some embodiments, if communications with the coordinator shard fail, they will be retried later and may then succeed if the coordinator shard becomes available again.

Once a transaction is open, it presents a dynamic view of the key-value store starting from the time the transaction was opened, including all changes performed within that transaction. This means that a user of the transaction can read uncommitted changes. However, an external user without that transaction cannot (i.e., no dirty reads). In certain embodiments, if a user does not wish to see their own local changes, they can toggle a function that hides these changes. In this case, the view presented is static from the time the transaction was opened, meaning get, and search operations will reflect the key-value pairs as they existed when the transaction was opened, even if they were since removed or replaced, even if they were removed or replaced by operations on the very transaction itself. Once the transaction is open, one or more key-value store operations may be performed. Upon completion of those operations, the transactions must be committed to the key-value store or aborted.

During the abort write transaction, the abort writing function will throw away any pending changes and leave the key-value store unaffected. In this case, no writing transaction will have been completed. Because the key-value store operates without locks, no locks require releasing, increasing the speed of the transactions. Similarly, there is no intent log to roll back. As a result, aborted transactions (both read and write) are inexpensive and need not be avoided.

Calling on a write transaction will attempt to commit the transaction. The write transaction presents the application with a consistent view of the key-value store and optimistically assumes that nothing in the shards touched by the transaction will otherwise move while the transaction is active. However, since no locks are held, this assumption is not a guarantee. It is possible that another transaction running in another thread might modify the same shards concurrently, and committing our transaction would corrupt and/or invalidate those changes.

Therefore, a conflict detection mechanism exists as part of the commit process. If another transaction commits a write transaction is committed after a new transaction has started, but before it committed, and if that other transaction modified the same key-value shards that our transaction modified, then our call to the commit function will fail. When the commit operation fails, it automatically aborts the transaction, so upon the commit operation returning the 'trans' is always destroyed, and the return code indicates if it was successfully applied or not.

Due to the design of the conflict detection mechanism, the larger a transaction is, the more likely it is to fail. Therefore, applications within the key-value store should be structured to use the smallest transactions possible while maintaining their atomicity requirements. In other words, while batching more work together to create larger transactions may require fewer transaction commits and naively decrease latency, in practice, it may result in increased conflict rates and actually increase latency due to the need for retries.

The key-value store supports a put function for adding new key-value pairs to the key-value store. The put function can include the following parameters: (1) the transaction that the put function is performed within, (2) the shard assignment value of the keyspace shard where the new key-value pair will be stored, (3) the pool assignment value within the corresponding keyspace shard where the new key-value pair will be stored, (4) the corresponding key of the new key-value pair, the key including an arbitrary binary blob, (5) the corresponding value of the new key-value pair, which is a single buffer and/or an iovec array in various put functions, and (6) the length of the data payload. In certain embodiments, the length of iovec array is at least as long as the specified length of the data payload.

The key-value store functions can be non-direct memory access (non-DMA). For example, when the put function is performed, the data will be copied out of the provided buffers and into the internal write buffer before the call returns. Therefore, it is safe to free or re-use the referenced memory immediately after the call. There is no alignment requirement for the buffers, but the internal copy may be faster if they are page-aligned.

Payloads can be stored in advance of the creation of new key-value pairs within the key-value store. One such function stores a blob of data to a specified pool and a payload structure function is initiated with a handle to the stored payload. The data can be copied into the data cache before the call returns, removing any alignment requirements and memory can be free or re-used after the call returns.

The key-value store can also perform DMA write functions. For example, a DMA write function bypasses the write buffering inside the key-value store and instead writes the payload directly to the chosen storage. The iovec array is generated from a DMA buffer. Unlike the other put functions, the DMA write function requires that the referenced memory remains valid until the transaction in which the operation is performed is committed or aborted.

The key-value store can also execute payload put functions. For example, the payload put function can create a key-value pair in the specified keyspace shard with the specified key. The payload put function provides the previously stored payload function as the value, rather than a new buffer.

The payload function can create more than one key-value pair using the same payload, in which case only a single copy of the value data is shared by all referencing keys. The payload function can also create key-value pairs from the payload call in multiple keyspace shards. The payload call can be valid only for the lifetime of the transaction in which it was created. If the payload from the payload function remains unused and the transaction is committed or aborted, it will be automatically cleaned up. Therefore, this eliminates the need for a clean-up function to "free" a payload.

The key-value store can execute key-value pair retrieval functions, referred to herein as get functions. The get function reads the desired key from the desired keyspace shard and pool, and populates the "value" buffer with the payload data. The actual length of the payload will be filled and the maximum amount of data that can be stored into "value" will be specified. The payload data is internally read into a cache, and then copied into the provided buffer. As such, there is no alignment requirement on "value," but page alignment may improve performance. In another embodiment, the key-value pair can be retrieved by handle. In other words, in such an embodiment, the payload is populated with a handle to the specific data, rather than by copying it into a buffer.

The key-value store can execute key-value pair search functions, referred to herein as search functions. The search function can be performed against a specific pool in a specific keyspace shard. A range of keys from beginning to end will be provided by the search function.

For each key-value pair found matching the criteria, the provided call back function is called. This callback function is provided with the key and the payload of the matched key-value pair, which it may operate on as previously described. Other transaction operations can be performed within the same callback, including the addition and/or removal of key-value pairs. If the callback returns non-zero, the search will be terminated, and the search value will return zero.

The key-value store can execute key-value pair removal functions, referred to herein as remove functions. The remove function call will remove the specified key from the specified keyspace and pool, if it exists. If it doesn't exist, no error is emitted. The remove function call will remove all keys in the specified key range from the specified keyspace and pool, if any exist. The remove functions are void because any errors that occur preventing processing are instead returned by the commit function. The remove function supports more complex removals. For example, the user can use a search function and selectively call the removal function from the search callback on the key-value pairs that are to be removed.

The key-value store can support a mechanism for enumerating the key-value pairs that differ between two keyspaces, referred to herein as a difference function. The difference function enumerates the differences between a first keyspace and a second keyspace. To enumerate the differences in a keyspace across two transactions, the two transactions and the same keyspace value for the first keyspace and the keyspace are provided to the difference function. To enumerate the differences between two keyspaces at a fixed time, the same transaction and two keyspaces are provided to the difference function. The provided callback function will be called for each key, which is not identical on both sides, along with the payload present in each keyspace. If a key exists in only one of the keyspaces, the corresponding payload for the other keyspace will be NULL. These payload pointers can then be used in the same manner as the get and search functions previously described. It is safe to perform further key-value store function calls from inside the callbacks.

The difference function should operate properly on any pair of keyspaces. However, in the case where the first keyspace and the second keyspace have common ancestry with respect to a keyspace clone, the enumeration of differences is accelerated. For example, if the second keyspace was cloned from the first keyspace, and then both were modified slightly, the difference function can rapidly locate the differences by ignoring large portions of the keyspaces that are known to be identical due to the copy-on-write nature of the cloning. The same is true when comparing a single keyspace across two transactions; only the changes must be considered. The difference function does not perform sorting, so the order in which the differing keys are returned is arbitrary. It would be possible to create a sorted version of the difference function.

The key-value store can support the generation of signatures of the contents of the key-value store at all levels of the data structures provided therein. The key-value store can use recursive hashing to generate a signature of the contents of the key-value store at all levels from the epoch down to individual payloads. This allows verifying the correctness of the data at rest and at all points during processing where needed. These signatures are updated incrementally as new content is added, and they are validated when content is read. Therefore, no particular action is needed on behalf of the application using the key-value store to ensure data integrity.

The signature function returns the signature of all the contents in the whole key-value store, while the keyspace signature function returns a signature on only the content pertinent to a specific keyspace. In either case, if any key-value pair within the scope of the signature is altered, or if any internal metadata is altered, the signature will change. The payload signature function returns the signature of a specific payload, which is simply the hash of the payload contents. These signatures are verified by the key-value store check infrastructure. As such, if one privately holds a signature, it can be used to verify that the datastore contents have not been altered, either logically or via tampering with or corruption of the physical storage.

In some embodiments, the XXH3 128-bit checksum can be used to generate these signatures. XXH3 is robust against accidental hash collisions, and thus is entirely adequate for data correctness verification purposes. It is not a cryptographic checksum and should not be relied upon if intentional, malicious data alteration is a concern. The key-value store contemplates the addition of other hashing mechanisms such as SHA1 or SHA256.

The key-value store supports a master daemon. The key-value store allows many shared and context functions to be running and using the key-value store simultaneously, but there must be exactly one that was opened with an open master function running at all times. A 'mastered' daemon can be provided, which is a daemon that runs a shared function as a service with an open master function and open compact function enabled. Therefore, if one instance of this daemon is running at all times, then one shared master function will be running.

The key-value store supports super-node and directory inode sharding. The key-value store can be constructed to support a POSIX file system implemented on the assumption that conflicting operations will rarely occur naturally. Normally, a file system has a record often called the "superblock," which tracks overall statistics about the system, such as the total number of files and directories, the total amount of used space, and so on. In a normal non-distributed system, this superblock is modified by many operations since many operations affect these counters. In the key-value store disclosed herein, this would be problematic because even if different operations were not conflicting due to their file and directory inode operations, they would be conflicting due to their shared desire to alter the superblock and adjust counters.

The key-value store mitigates these issues by sharding the superblock. So, instead of a single superblock, the key-value store can have many, nominally one per shard, and each operation that modifies a given shard tracks its counters only in the superblock record for that shard. Because of this, if a key-value store client wants to compute the total counters for the whole system, all of the superblock records must be collected and their counters are summed.

Similarly, each operation that adds or removes a file from a directory must update a child count on the directory. The need to update these counts can drive transaction conflicts when small files are created or removed in the same directory by different clients. In a similar way to the superblock, the key-value store mitigates this effect by instead having a set of K "directory counterobjects," hashing each file to one of those counter objects, and incrementing or decrementing its counter accordingly. Similarly with the superblock, if the key-value store client wants to get the total child count on a directory, the key-value store client must fetch all of these counter objects and sum them, but that is comparatively.

FIG. 5 is a simplified flowchart illustrating a representative operational implementation of a method for creation of a new keyspace shard within the key-value store. It is appreciated that the listing of the steps as recited in relation to FIG. 5 can be modified from what is specifically described herein. More specifically, the order of the recited steps can be changed, any steps can be combined or omitted, or more steps can be added to the specific steps noted herein, provided the resulting flowchart does not stray from the general teachings provided herein. Additionally, the steps shown and described with respect to FIG. 5 can be combined with steps from other methods shown and described herein (e.g., FIGS. 4 and 6).

At step 577, a key-value store, including a plurality of keyspaces, is portioned into a plurality of shards, including a coordinator shard and a first shard. The coordinator shard references to the first shard. The first shard includes a first data structure. The first data structure includes a first key-value pair.

At step 578, a second key-value pair, including a second key, is created.

At step 579, a second shard assignment value is received for a second key-value pair from a key-value store client, the key-value store client having access to the key-value store. The second shard assignment value can be algorithmically determined by the key-value store client.

At step 580, a second shard is created using the second shard assignment value. The second shard includes a second data structure. The second shard can include a value shard.

At step 581, the second key-value pair is assigned to the second shard based on the second shard assignment value.

At step 582, the first shard is updated to reference to the second shard.

At step 583, the coordinator shard is updated to reference to the second shard of the key-value store.

At step 584, the second shard is written to a storage device.

FIG. 6 is a simplified flowchart illustrating a representative operational implementation of a method for creation of a new keyspace shard within the key-value store. It is appreciated that the listing of the steps as recited in relation to FIG. 6 can be modified from what is specifically described herein. More specifically, the order of the recited steps can be changed, any steps can be combined or omitted, or more steps can be added to the specific steps noted herein, provided the resulting flowchart does not stray from the general teachings provided herein. Additionally, the steps shown and described with respect to FIG. 6 can be combined with steps from other methods shown and described herein (e.g., FIGS. 4 and 5).

The key-value store supports the cloning of keyspaces. A new keyspace can be created by making a persistent redirected replica of an existing keyspace. Cloning an existing keyspace involves making a new keyspace epoch that points to the same set of internal nodes as the originating keyspace.

As both keyspaces are changed thereafter, they follow the usual copy-on-write scheme as described herein.

At step 685, a first keyspace is generated that includes a first shard.

At step 686, a coordinator shard is updated to reference to the first shard.

At step 687, a second shard is generated that includes a persistent redirected replica of the first shard.

At step 688, the coordinator shard is updated to reference to the second shard while the first shard remains unmodified.

At step 689, a second epoch of the second shard is updated to reference to a first data payload of the first shard.

At step 690, a snapshot of each shard is generated.

In summary, as described in detail herein, the technology of the present application enables key features including, but not limited to:

An all-new, scale-out software architecture built for the latest flash technologies to deliver consistent, low-latency performance at any scale;

A modern microservices architecture, orchestrated by an open-source system for automating deployment, scaling, and management of containerized applications, to provide a resilient, "always on" architecture and deliver new features and fixes rapidly with less risk;

Self-healing, self-balancing software for in-service upgrades that automatically rebuilds and repairs data in the background while also rebalancing data as the storage cluster expands, shrinks, and changes;

Automated detection, deployment, and configuration of storage nodes within a cluster so a cluster can be scaled, modified, or shrunk non-disruptively, without user intervention;

Automated networking management of the internal RDMA fabric, so managing even a large cluster requires no networking expertise;

Inline data deduplication and compression to reduce the cost of flash storage and improve data efficiencies relative to legacy storage platforms;

Simple data security and ransomware recovery with built-in snapshots, clones, snapshot recovery tools, and "roll back" capabilities;

Inline metadata tagging to accelerate AI/ML data processing, provide real-time data analytics, enable rapid creation of data lakes based on tags, and automate data pipelines and workflows;

Real-time monitoring of system health, performance, capacity trending, and more from a secure online portal by connecting to cloud-based AI Operations software;

Consistent Low-Latency Performance for High Bandwidth, High IOPS Applications: The present technology's distributed architecture is based on a transactional key/value store designed for NVMe and RDMA that delivers consistent, low-latency performance for any unstructured data workload at any scale;

Modern Microservices Architecture Orchestrated by Kubernetes®: The present technology is fully containerized and uses familiar, proven cloud technologies like Kubernetes to deliver simplicity, automation, and resilience at even the highest scale. Adopt and deploy new features and fixes faster and more predictably with less risk;

Runs on Standard High-Volume Flash Storage: The present technology does not rely on any specialized hardware, so you can quickly adopt the latest hardware, reduce costs of flash and hybrid-cloud storage over time, adapt your storage infrastructure to meet future requirements; and Zero-Touch Storage and Network Management: The soft-
ware automates much of the storage management and
networking management, so that even large clusters
can be managed with almost no IT involvement. Soft-
ware automatically detects, deploys, and configures
new storage nodes within a cluster so you can scale,
modify, and even shrink your cluster non-disruptively.

It is understood that although a number of different
embodiments of the systems and methods for key-value
shard creation in a key-value store have been illustrated and
described herein, one or more features of any one embodi-
ment can be combined with one or more features of one or
more of the other embodiments, provided that such combi-
nation satisfies the intent of the present technology.

While a number of exemplary aspects and embodiments
of the systems and methods for key-value shard creation in
a key-value store have been discussed above, those of skill
in the art will recognize certain modifications, permutations,
additions, and sub-combinations thereof. It is, therefore,
intended that the following appended claims and claims
hereafter introduced are interpreted to include all such
modifications, permutations, additions, and sub-combina-
tions as are within their true spirit and scope.

What is claimed is:

1. A method for key-value shard creation and manage-
ment in a key-value store, the method comprising the steps
of:

partitioning the key-value store including a plurality of
key spaces into a plurality of shards, the plurality of
shards including a coordinator shard;

receiving a first shard assignment value for a first key-
value pair from a key-value store client, the key-value
store client having access to the key-value store,
wherein the first shard assignment value is algorithmi-
cally determined by the key-value store client to bal-
ance data collocation and collision probability;

creating a first shard using the first shard assignment
value, the first shard including a data structure config-
ured to allow lock-free concurrent read access;

assigning the first key-value pair to the first shard based
on the first shard assignment value; and updating the coordinator shard to reference to the first
shard by storing a mapping from the first shard assign-
ment value to a root pointer of the first shard.

2. The method of claim 1, wherein the method further
comprises a step of writing the first shard to a storage device.

3. The method of claim 1, wherein the method further
comprises a step of storing modifications to the first shard in
a modified version of the first shard while the first shard
remains unmodified.

4. The method of claim 3, wherein the step of storing
modifications is completed using a redirected write opera-
tion.

5. The method of claim 1, wherein the data structure
includes a b+ tree.

6. The method of claim 1, wherein the first shard includes
a first keyspace shard.

7. The method of claim 1, wherein each shard within the
plurality of shards includes logically independent key-val-
ues from any other shard within the plurality of shards.

8. The method of claim 1, wherein each shard within the
plurality of shards is independently modifiable from any
other shard within the plurality of shards.

9. The method of claim 1, wherein the method further
comprises a step of generating a second shard, the second
shard including a persistent redirected replica of the first
shard.

10. The method of claim 9, wherein the second shard
includes a second shard epoch that references to a first data
payload of the first shard.

11. The method of claim 9, wherein the method further
comprises a step of updating the coordinator shard to
reference to the second shard.

12. A method for key-value shard creation and manage-
ment in a key-value store, the method comprising the steps
of:

partitioning the key-value store including a plurality of
keyspaces into a plurality of shards, the plurality of
shards including a coordinator shard and a first shard,
the coordinator shard referencing to the first shard, the
first shard including a first data structure, the first data
structure including a first key-value pair;

creating a second key-value pair;

receiving a second shard assignment value for the second
key-value pair from a key-value store client, the key-
value store client having access to the key-value store,
wherein the second shard assignment value is algorith-
mically determined by the key-value store client;

creating a second shard using the second shard assign-
ment value, the second shard including a second data
structure;

assigning the second key-value pair to the second shard
based on the second shard assignment value;

updating the first shard to reference to the second shard
using a redirected write operation that creates a modi-
fied version of the first shard while the first shard
remains unmodified; and updating the coordinator shard to reference to the second
shard by storing a mapping from the second shard
assignment value to a root pointer of the second shard.

13. The method of claim 12, wherein the method further
comprises a step of writing the second shard to a storage
device.

14. The method of claim 12, wherein the method further
comprises a step of storing modifications to the second shard
in a modified version of the second shard while the second
shard remains unmodified.

15. The method of claim 14, wherein the step of storing
modifications is completed using a redirected write opera-
tion.

16. The method of claim 12, wherein each of the data
structures includes a b+ tree.

17. The method of claim 12, wherein the second shard
includes a value shard.

18. The method of claim 12, wherein the second shard
assignment value is algorithmically determined.

19. A method for key-value shard creation and manage-
ment in a key-value store, the method comprising the steps
of:

partitioning the key-value store including a plurality of
keyspaces into a plurality of shards, the plurality of
shards including a coordinator shard;

receiving a first shard assignment value for a first key-
value pair from a key-value store client, the key-value
store client having access to the key-value store,
wherein the first shard assignment is algorithmically
determined by the key-value store client;

creating a first shard using the first shard assignment
value, the first shard including a data structure;

assigning the first key-value pair to the first shard based
on the first shard assignment value;

updating the coordinator shard to reference to the first
shard by storing a mapping from the first shard assign-
ment value to a root pointer of the first shard;

creating a second key-value pair;

receiving a second shard assignment value for the second key-value pair from the key-value store client, wherein the second shard assignment is algorithmically determined by the key-value store client;

assigning the second key-value pair to a second shard based on the second shard assignment value;

updating the first shard to reference to the second shard;

updating the coordinator shard to reference to the second shard by storing a mapping from the second shard assignment value to a root pointer of the second shard;

generating a third shard that includes a persistent redirected replica of the first shard, the third shard including a third epoch that references to a first data payload of the first data structure; and updating the coordinator shard to reference to the third shard.

* * * * *